United States Patent
Kim et al.

(10) Patent No.: US 9,554,449 B2
(45) Date of Patent: Jan. 24, 2017

(54) COMPACT LOW ENERGY SHORT RANGE PASSIVE INFRARED (PIR) SENSOR WITH LEDS FOR BAGS

(71) Applicant: HolsterLab LLC, Nampa, ID (US)

(72) Inventors: Edward J. Kim, Worcester, MA (US); Chadd Van Komen, Nampa, ID (US)

(73) Assignee: HolsterLab LLC, Nampa, ID (US)

( * ) Notice: Subject to any disclaimer, the term of this patent is extended or adjusted under 35 U.S.C. 154(b) by 333 days.

(21) Appl. No.: 14/480,833

(22) Filed: Sep. 9, 2014

(65) Prior Publication Data

US 2016/0073476 A1 Mar. 10, 2016

(51) Int. Cl.
*H05B 37/02* (2006.01)

(52) U.S. Cl.
CPC .................. *H05B 37/0227* (2013.01)

(58) Field of Classification Search
CPC ..... H05B 37/02; H05B 37/0227; F21V 23/04; F21V 23/0471; F21Y 2101/02; F21L 4/00
USPC .......... 315/152, 291, 307; 362/84, 103, 104, 362/154–156, 183, 800
See application file for complete search history.

(56) References Cited

U.S. PATENT DOCUMENTS

2012/0147594 A1* 6/2012 Tait .................. A45C 3/06
362/156

* cited by examiner

*Primary Examiner* — Jimmy Vu
(74) *Attorney, Agent, or Firm* — Swanson & Bratschun, L.L.C.

(57) ABSTRACT

Novel tools and techniques are provided for illuminating a portable space, which, in some cases, is based on passive infrared ("PIR") detection. In some embodiments, a first device might detect presence of at least a portion of a user's body (e.g., a hand or face of the user, etc.). Based at least in part on detection of the presence of the at least a portion of the user's body, a second device might illuminate an interior space of a bag or other portable enclosure. In some cases, the first and second devices might be the same device, while, in other cases, the first and second devices might be separate yet communicatively coupled to each other (such as via wireless or wired connection). In some embodiments, the first device might include a passive infrared sensor or the like, while the second device might include light emitting diodes or the like.

27 Claims, 8 Drawing Sheets

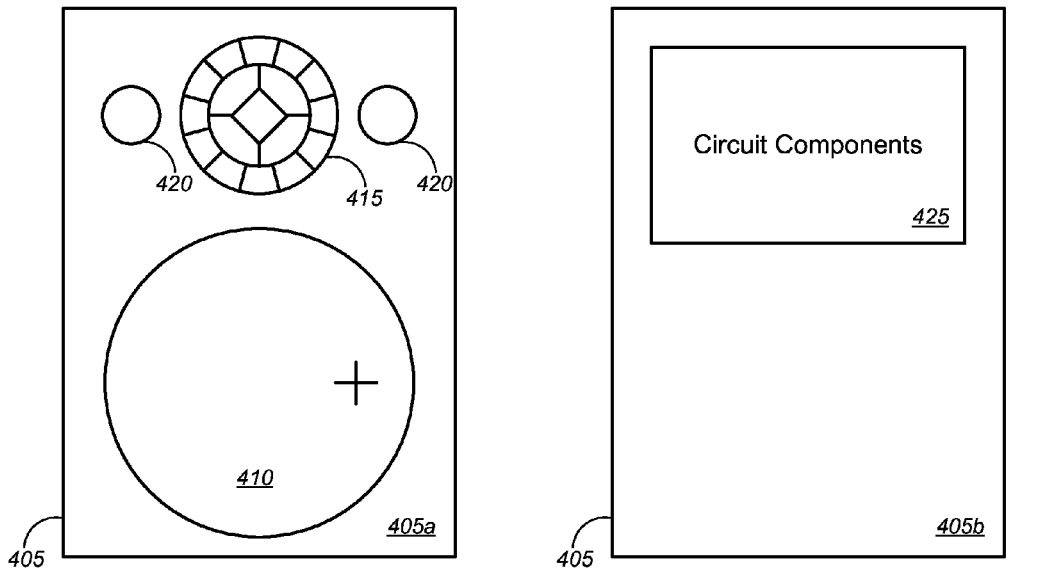
Fig. 4A
Fig. 4B
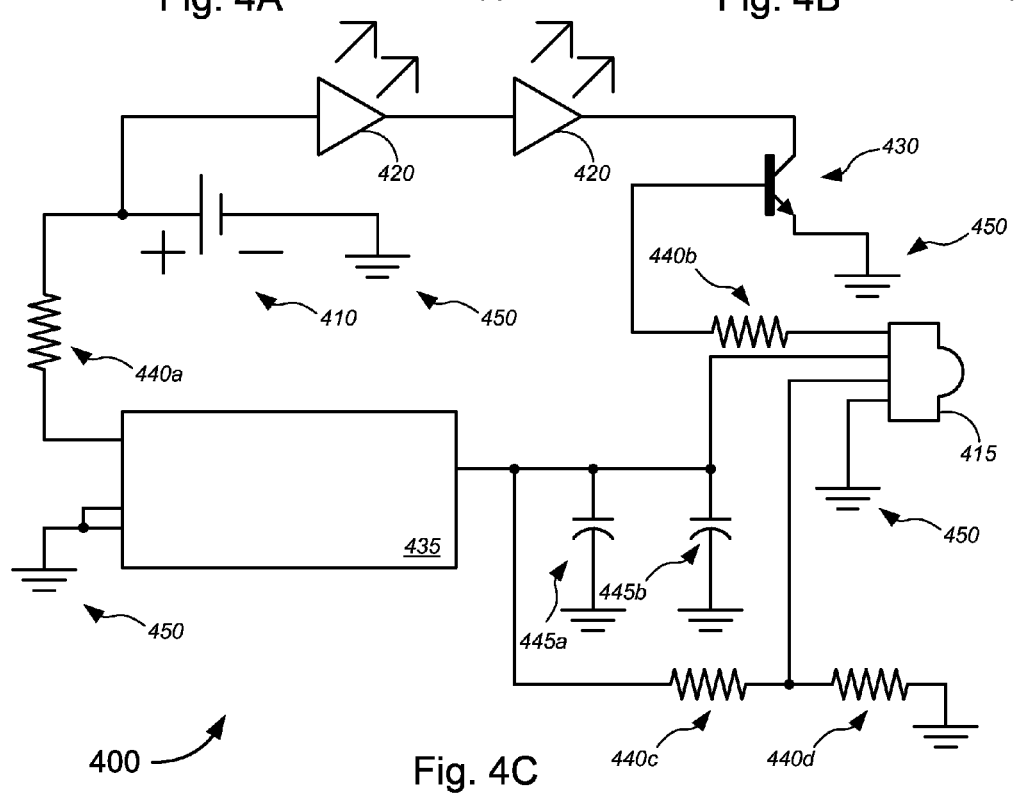
Fig. 4C

COMPACT LOW ENERGY SHORT RANGE PASSIVE INFRARED (PIR) SENSOR WITH LEDS FOR BAGS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a device, system, and method for illuminating a portable space or enclosure, and, more particularly, to a device, system, and method for illuminating a portable space or enclosure, based on passive infrared ("PIR") detection.

BACKGROUND

When searching through one's bag or other portable enclosure (e.g., backpack, handbag, purse, gym bag, etc.), especially in low-light conditions, it is extremely difficult to see the item(s) that one is looking for. Inevitably, one has to empty the bag or other portable enclosure in order to locate the item(s).

Although sensor activated lights (such as passive infrared ("PIR")-triggered lighting systems) exist for drawers, cupboards, pantries, home security systems, indoor house lamps, outdoor activated lights for the home, and the like, such systems are typically for static structures or enclosures, and thus are either bulky and/or ill-suited for portable enclosures or the like.

Hence, there is a need for more robust and scalable solutions for illuminating a portable space (such as within a portable enclosure or the like).

BRIEF SUMMARY

Various embodiments provide techniques for providing light within a portable space (in some cases, based on passive infrared ("PIR") detection).

According to some embodiments, a device might include a sensor (including, but not limited to, a PIR sensor or the like) and a light source (including, without limitation, light emitting diodes ("LEDs") or the like). The device might be removably attached or permanently affixed to an interior surface of a bag or other suitable portable enclosure (or the like), typically near an opening of the bag. When a person reaches his or her hand within the bag to retrieve an item(s), the PIR sensor would detect one or both of the person's body heat (from his or her hand) and/or the motion of the person's hand. The sensing of the person's hand might trigger the activation of the LEDs, thereby illuminating the interior space of the bag, so as to allow the person to see inside the bag to locate the sought-after item(s).

In some cases, the sensor and the light source might be embodied as separate devices, both located within the interior surface of the bag or other suitable portable enclosure, and both in communication with each other (either through a wired connection or through wireless communication).

The tools provided by various embodiments include, without limitation, methods, systems, and/or software products. Merely by way of example, a method might comprise one or more procedures, any or all of which might be executed by a computer system. Correspondingly, an embodiment might provide a computer system configured with instructions to perform one or more procedures in accordance with methods provided by various other embodiments. Similarly, a computer program might comprise a set of instructions that are executable by a computer system, or by a processor located in the computer system, to perform such operations. In many cases, such software programs are encoded on physical, tangible, and/or non-transitory computer readable media. Such computer readable media might include, to name but a few examples, optical media, magnetic media, and the like.

In an aspect, a method might comprise detecting, with a first device, presence of at least a portion of a body of a user within an interior space of a portable enclosure, and illuminating, with a second device, an interior space of a portable enclosure, based at least in part on detection of the presence of the at least a portion of the body of the user within the interior space of the portable enclosure.

In some embodiments, each of the first device or the second device is removably attachable to at least one of an interior surface of the portable enclosure or an opening of the portable enclosure. According to some embodiments, the first device might comprise an infrared sensor. In some cases, the infrared sensor might comprise a passive infrared ("PIR") sensor. In some instances, the infrared sensor might comprise a compact PR sensor. In some embodiments, detecting, with the first device, presence of at least a portion of a body of a user might comprise detecting, with the infrared sensor, heat emitted by the at least a portion of the body of the user. In some cases, detecting, with the first device, presence of at least a portion of a body of a user might comprise detecting, with the infrared sensor, motion of the at least a portion of the body of the user.

In some embodiments, the second device might comprise at least one light source. In some instances, the at least one light source might comprise at least one light emitting diode ("LED"). In some cases, the at least one light source might comprise at least one organic light emitting diode ("oLED"). In yet other cases, the at least one light source might including, without limitation, one or more of at least one liquid crystal display ("LCD"), at least one micro lamp, at least one micro bulb, at least one micro LED, and/or the like.

Merely by way of example, in some cases, the first device and the second device might be separate devices that are communicatively coupled together. In some embodiments, the first device and the second device might be in wireless communication with each other. In some instances, the first device and the second device might be in wired communication with each other. According to some embodiments, the first device might be one of located at an opening of the portable enclosure, located within the portable enclosure near the opening of the portable enclosure, or located deep within the portable enclosure, while the second device might be one of located at an opening of the portable enclosure, located within the portable enclosure near the opening of the portable enclosure, or located deep within the portable enclosure. In some cases, the first device and the second device might be co-located (i.e., located in the same location, such as one of the three locations described above).

In some embodiments, the first device and the second device might be embodied within a single third device. In some cases, at least one of the first device, the second device, or the third device might comprise an attachment mechanism configured to attach to a surface of the portable enclosure. The attachment mechanism, in some instances, might comprise at least one of a portion of a hook-and-loop attachment mechanism, a magnetic attachment mechanism, a clip-based attachment mechanism, an adhesive-based attachment mechanism, a buckle-based attachment mechanism, a button-based attachment mechanism, a snap-based attachment mechanism, a clasp-based attachment mechanism, a zipper-based attachment mechanism, or a pin-based attachment mechanism, and/or the like. According to some embodiments, the single third device might be one of located at an opening of the portable enclosure, located within the portable enclosure near the opening of the portable enclosure, or located deep within the portable enclosure.

In some cases, the portable enclosure might comprise one of a bag, a portable box, a cargo container, or a vehicle. In some instances, the bag might comprise one of a piece of luggage, a travel bag, a tote, a lunch bag, a purse, a handbag, a backpack, a satchel, a briefcase, a laptop bag, a tool bag, a hiking bag, a bandolier, a pouch, a belted bag, a waist pack, a gym bag, or a sports equipment bag.

According to some embodiments, illuminating, with a second device, the interior space of the portable enclosure might comprise illuminating, with a second device, the interior space of the portable enclosure, based at least in part on detection of the presence of the at least a portion of the body of the user within the interior space of the portable enclosure and based at least in part on a determination that external light (e.g., room light, street light, sunlight, and/or the like) is insufficient to illuminate the interior space of the portable enclosure.

In another aspect, a system might comprise a portable enclosure, a first device, and a second device. The first device might comprise a sensor that is configured to detect presence of at least a portion of a body of a user within an interior space of the portable enclosure. The second device might comprise a light source that is configured to illuminate the interior space of the portable enclosure, based at least in part on detection of the presence of the at least a portion of the body of the user within the interior space of the portable enclosure.

According to some embodiments, the first device and the second device might be embodied within a single third device. In some cases, at least one of the first device, the second device, or the third device might comprise an attachment mechanism configured to attach to a surface of the portable enclosure. The attachment mechanism, in some instances, might comprise at least a portion of at least one of a hook-and-loop attachment mechanism, a magnetic attachment mechanism, a clip-based attachment mechanism, an adhesive-based attachment mechanism, a buckle-based attachment mechanism, a button-based attachment mechanism, a snap-based attachment mechanism, a clasp-based attachment mechanism, a zipper-based attachment mechanism, or a pin-based attachment mechanism, and/or the like. According to some embodiments, the single third device might be one of located at an opening of the portable enclosure, located within the portable enclosure near the opening of the portable enclosure, or located deep within the portable enclosure.

In yet another aspect, an apparatus might comprise a first device and a second device. The first device might comprise a sensor that is configured to detect presence of at least a portion of a body of a user within an interior space of a portable enclosure. The second device might comprise a light source that is configured to illuminate the interior space of the portable enclosure, based at least in part on detection of the presence of the at least a portion of the body of the user within the interior space of the portable enclosure.

In some embodiments, the apparatus might further comprise at least one processor and a computer readable medium in communication with the at least one processor. The computer readable medium might have stored thereon computer software comprising a set of instructions that, when executed by the at least one process, causes the apparatus to perform one or more functions. The set of instructions might comprise instructions for receiving presence information from the sensor, in response to the sensor detecting presence of at least a portion of a body of a user within the interior space of the portable enclosure, and instructions for causing the light source to illuminate the interior space of the portable enclosure, based at least in part on the received presence information from the sensor.

According to some embodiments, the instructions for causing the light source to illuminate the interior space of the portable enclosure comprises instructions for causing the light source to illuminate the interior space of the portable enclosure, based at least in part on detection of the presence of the at least a portion of the body of the user within the interior space of the portable enclosure and based at least in part on a determination that external light (e.g., room light, street light, sunlight, and/or the like) is insufficient to illuminate the interior space of the portable enclosure. In some embodiments, the instructions for causing the light source to illuminate the interior space of the portable enclosure might comprise instructions for causing the light source to illuminate the interior space of the portable enclosure for a predetermined duration. In some cases, the predetermined duration might range from 2-10 seconds (e.g., such as 2-10 seconds after the sensor no longer detects presence of the at least a portion of the body of the user).

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 4A-4C are diagrams illustrating one set of embodiments for an apparatus for providing illumination within a portable space.

DETAILED DESCRIPTION OF CERTAIN EMBODIMENTS

Figure 1A:
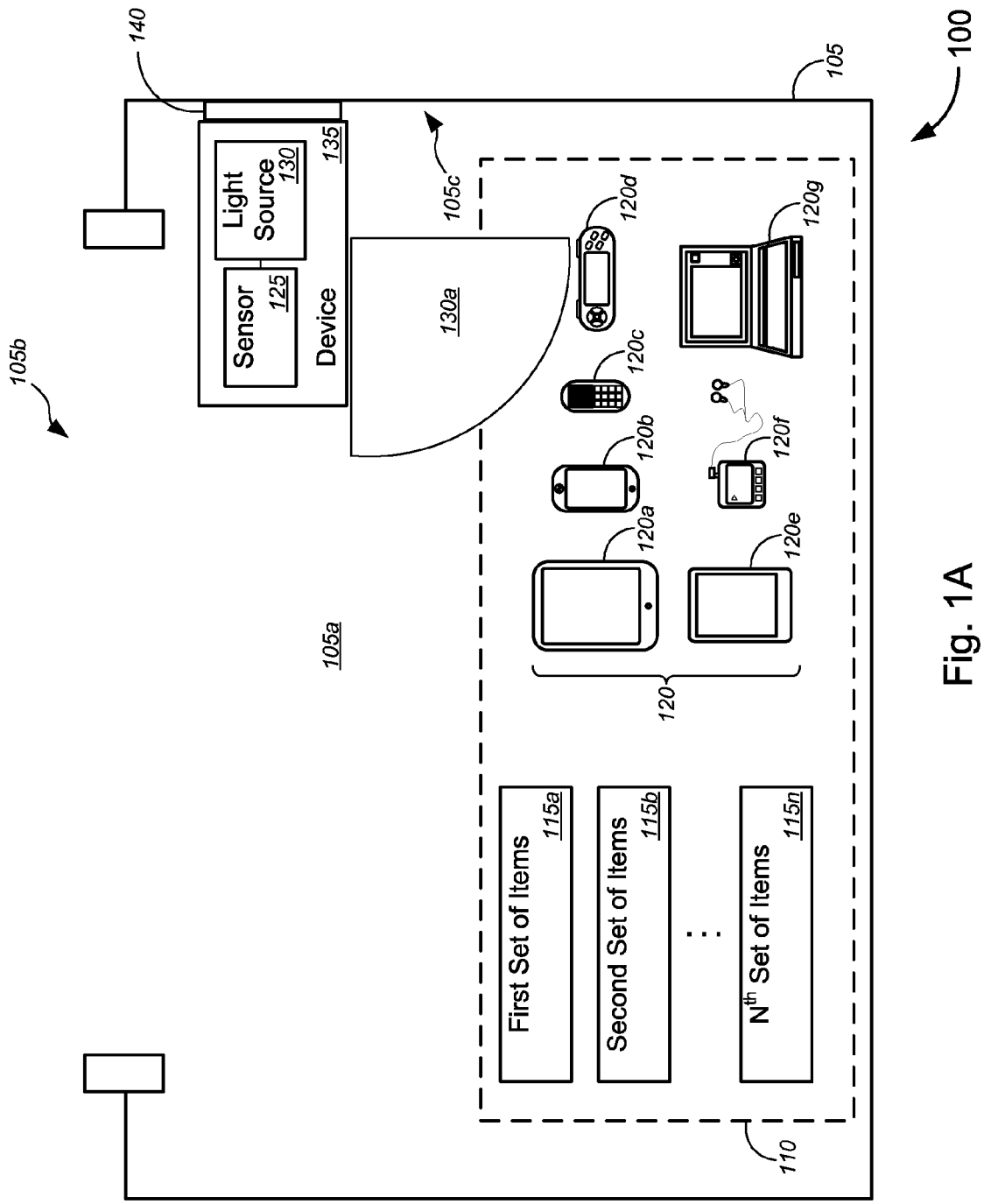
FIGS. 1A-1C are general schematic diagrams illustrating various systems for providing illumination within a portable space, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for providing illumination within a portable space (such as within a portable enclosure or the like), which, in some cases, may be based on detection of a portion of a user's body (such as by passive infrared ("PIR") detection, or the like).

According to some embodiments, a device might include a sensor (including, but not limited to, a PIR sensor, a motion sensor, a heat sensor, or the like) and a light source (including, without limitation, light emitting diodes ("LEDs"), organic LEDs ("oLEDs"), micro lamps, micro bulbs, or the like). The device might be removably attached or permanently affixed to an interior surface of a bag or other suitable portable enclosure (or the like), typically near an opening of the bag. When a person reaches his or her hand within the bag to retrieve an item(s) (or places his or her head over the opening of the bag to look for the item(s)), the PIR sensor would detect one or both of the person's body heat (from his or her hand/head/other body part) and/or the motion of the person's hand/head/other body part. The sensing of the person's hand/head/other body part might trigger the activation of the LEDs, thereby illuminating the interior space of the bag, so as to allow the person to see inside the bag to locate the sought-after item(s).

In some cases, the sensor and the light source might be embodied as separate devices, both located within the interior surface of the bag or other suitable portable enclosure, and both in communication with each other (either through a wired connection or through wireless communication). In some embodiments, a processor might be provided in the device to control sensor operations and/or to control lighting operations. The processor, in some cases, might be embodied as a microprocessor, as a mere delay circuit, or as any other suitable type of processor, and the like.

We now turn to the embodiments as illustrated by the drawings. FIGS. 1-6 illustrate some of the features of the method, system, and apparatus for providing illumination within a portable space, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

Figure 1B:
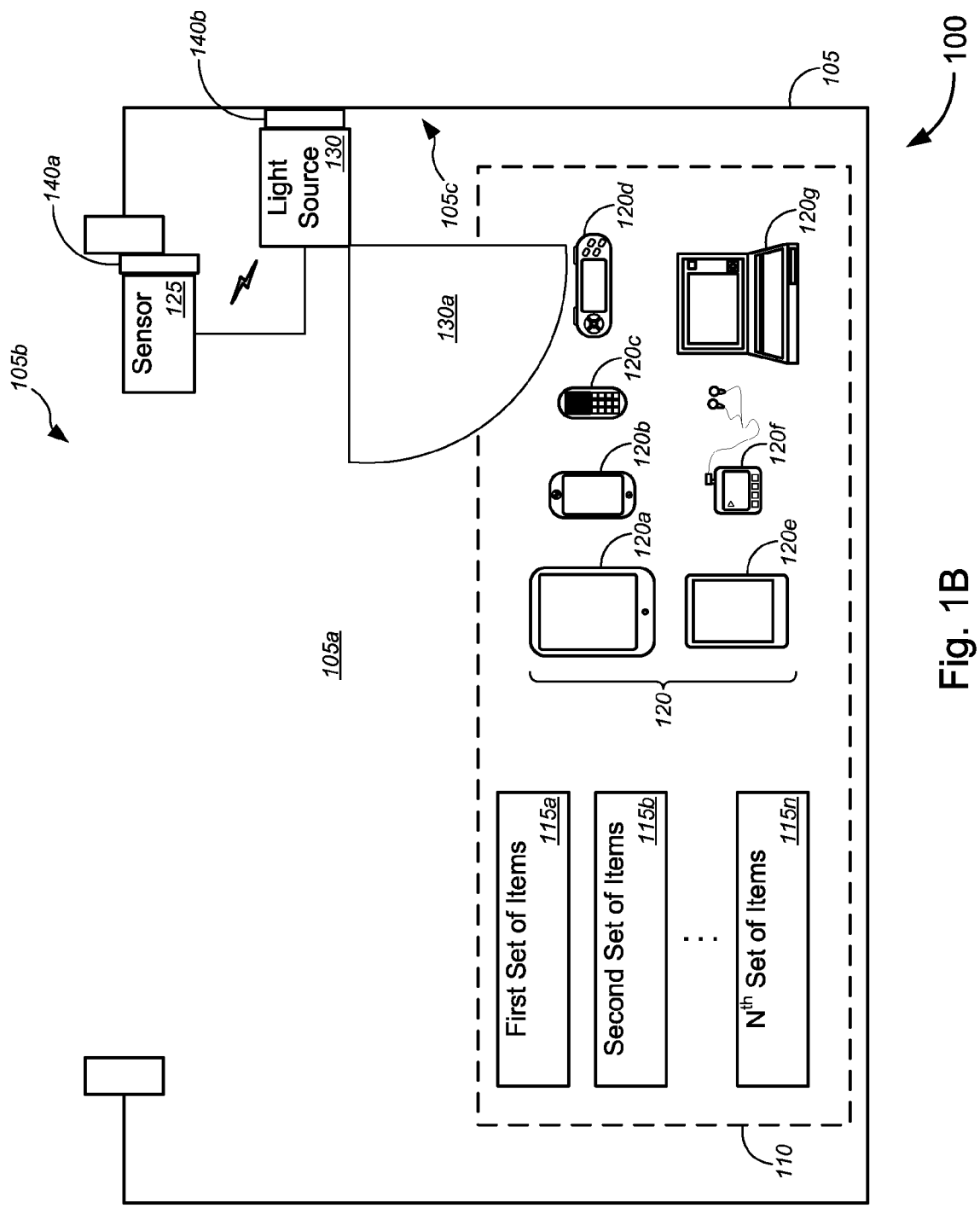
Figure 1C:
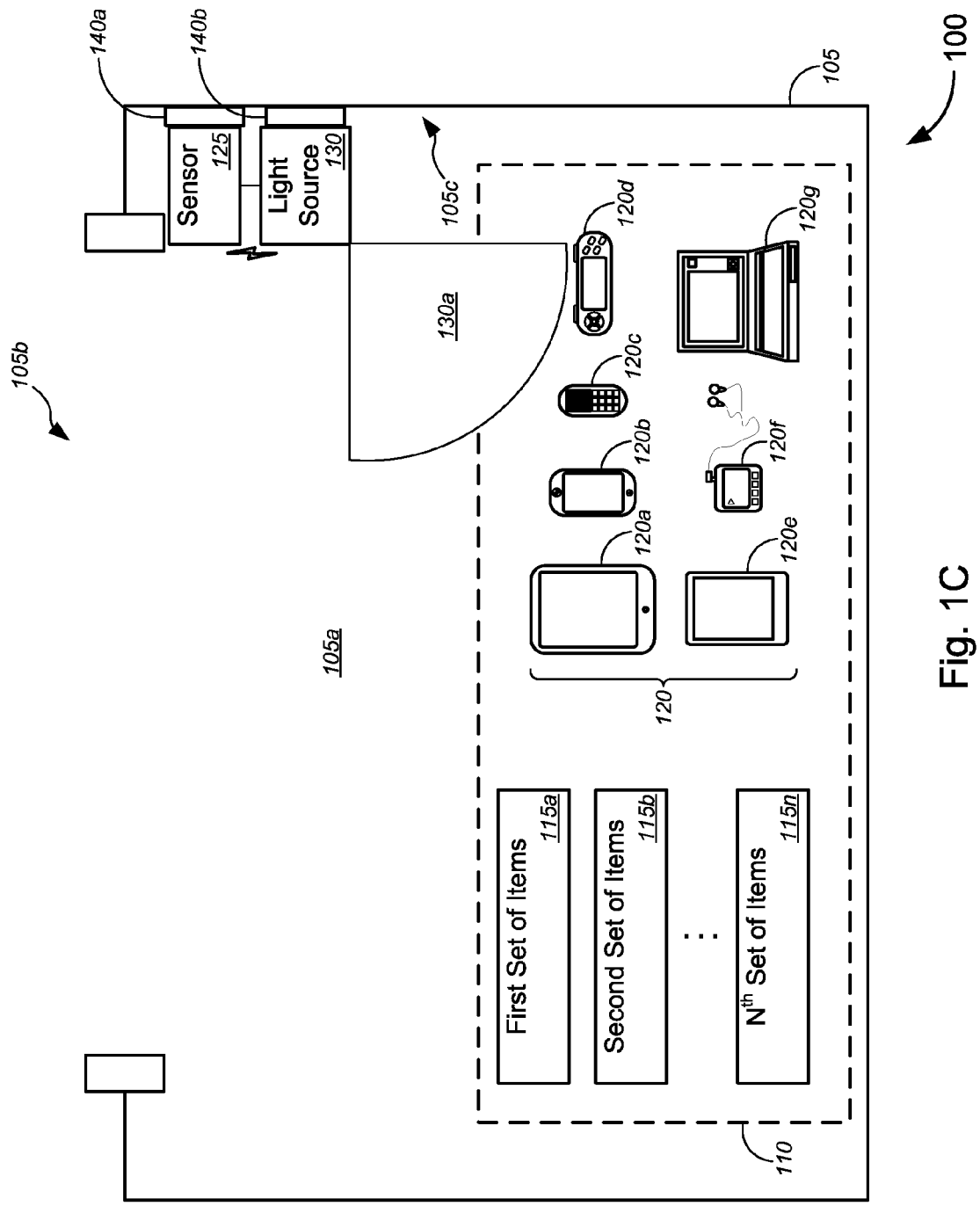

With reference to the figures, FIGS. 1A-1C (collectively, "FIG. 1") are general schematic diagrams illustrating various systems 100 for providing illumination within a portable space, in accordance with various embodiments. FIG. 1A illustrates an embodiment in which a sensor and a light source are embodied within a single device, while FIGS. 1B and 1C illustrate embodiments in which the sensor and the light source are embodied as separate devices that are in communication with each other. FIG. 1B shows the sensor being located at an opening of the portable enclosure, while FIG. 1C shows the sensor being located within the portable enclosure near the opening of the portable enclosure. Herein, an "opening" of the portable enclosure might refer to an opening through which items placed in the portable enclosure can pass (or are intended to pass) when the items are placed in or removed from the portable enclosure. Although not shown, in some cases, the sensor, the light source, and/or the single device comprising both the sensor and the light source may be located deep within the portable enclosure.

In FIG. 1, system 100 might comprise a portable enclosure 105, which in some cases may be embodied as one of a bag, a box (i.e., a box that is not (and is not intended to be) mounted to any structure or surface), a cargo container (or other shipping container or the like), and/or a vehicle, or the like. Herein, cargo or shipping containers might include any suitable containers for transporting items, and such containers may be configured for transport by ship, by train, by tractor-trailer trucks, by airplane, or any other suitable vehicle. In other words, the portable enclosure 105 may be any suitable enclosure that is not fixed in any one location (as compared with fixed enclosures such as drawers, cupboards, pantries, rooms of a home, etc.), and has a space therein that may require illumination. According to some embodiments, the bag may include, but is not limited to, one of a piece of luggage, a travel bag, a tote, a lunch bag, a purse, a handbag, a backpack, a satchel, a briefcase, a laptop bag, a tool bag, a hiking bag, a bandolier, a pouch, a belted bag, a waist pack (which in some cases might be referred to as a "fanny pack" or the like), a gym bag, or a sports equipment bag, and/or the like. The portable enclosure might comprise an interior space 105a, an opening 105b, and an interior surface 105c. The portable enclosure 105 might, in some cases, further comprise a closure mechanism (not shown) to close the opening 105b. The closure mechanism might include, without limitation, a zipper mechanism, a clasp mechanism, a magnetic closure mechanism, a button-based closure mechanism, a flap-based closure mechanism, a snap-based closure mechanism, a buckle-based closure mechanism (including, but not limited to, a belt buckle-based closure mechanism, a plastic buckle-based closure mechanism, a metal buckle-based closure mechanism, etc.), and/or the like. In some embodiments, the closure mechanism is not a lid; in other words, the bag or other portable enclosure 105 is a lid-less bag or other portable enclosure 105. Rather than a lid, the bag or other portable enclosure 105 either might have no closure mechanism or might have a non-lid-type closure mechanism (such as any of the closure mechanisms listed above). The portable enclosure 105 may be made of any suitable material, including, without limitation, cloth, synthetic materials, leather, animal hide, metal, plastic, and/or the like.

According to some embodiments, portable enclosure 105 might include any one or more items 110 that a user desires to place in the portable enclosure 105. The one or more items 110 might include, without limitation, first through $N^{th}$ sets of items 115a-115n (collectively, "set of items 115") and one or more user devices 120. In some embodiments, one of the sets of items 115 might include a set of books, study materials, note-taking materials, writing materials, and/or the like. In additional or alternative embodiments, one of the sets of items 115 might include medications or vitamins, or the like. Alternatively or additionally, one of the sets of items 115 might include personal hygiene products, toiletry products, cleaning products, and/or the like. In some cases, one of the sets of items 115 might include jewelry, clothing, sports equipment, and/or the like. In some instances, one of the sets of items 115 might include, without limitation, passes or tickets to venues or events, eyewear, time pieces (e.g., watches, stopwatches, clocks, etc.), money, food, snacks, gifts, store purchases, toys, weapons, any suitable type of item that can fit within a portable enclosure, and/or the like. The one or more user devices 120 might include, but are not limited to, a tablet computer 120a, a smart phone 120b, a mobile phone 120c, a portable gaming device 120d, an e-book reader 120e, a portable media player 120f, a laptop computer 120g, and/or any other suitable portable electronic device.

System 100 might further comprise one or more sensors 125 and one or more light sources 130. The one or more sensors 125 might include, without limitation, one or more of at least one infrared sensor, at least one motion sensor, at least one (non-infrared-based) heat sensor, and/or the like. In some cases, the at least one infrared sensor might include, without limitation, at least one passive infrared ("PIR") sensor, at least one compact PR sensor, at least one low-energy compact PIR sensor, and/or the like. According to some embodiments, the one or more sensors 125 might include a compact low energy PR sensor, or the like. In some cases, the one or more sensors 125 might include a compact low energy short range PIR sensor, or the like.

In some instances, the one or more sensors 125 might be configured to detect presence of at least a portion of a user's body, by detecting heat emitted by the at least a portion of the user's body, by detecting motion of the at least a portion of the user's body, or by detecting both heat and motion of the at least a portion of the user's body. In some cases, the one or more sensors 125 might be configured to detect body temperature, and might detect presence of at least a portion of the user's body by determining that an object detected (by heat and/or motion detection) has a temperature that is at least body temperature. Typical core body temperatures might be about 37.0±1.0° C. (or 98.6±1.8° F.), while temperature of extremities (e.g., hands, feet, etc.) might be lower. In cold environments, core body temperatures might drop, with body temperatures of about 24.0° C. (or 75.2° F.) or less typically leading to complications that eventually lead to death. Thus, in some cases, the one or more sensors 125 might detect presence of at least a portion of the user's body by determining that an object detected (by heat and/or motion detection) has a temperature of at least 24.0° C. (or 75.2° F.). In some embodiments, the one or more sensors 125 might be configured to detect (heat and/or motion) of the at least a portion of the user's body, as the at least a portion of the user's body (e.g., the user's hand(s), or the like) reaches within the portable enclosure 105. In some cases, the one or more sensors 125 might be configured to detect (heat and/or motion) of the at least a portion of the user's body, as the at least a portion of the user's body (e.g., the user's head) hovers over the opening 105b of the portable enclosure 105. When the one or more sensors 125 detects presence of the at least a portion of the user's body, the one or more sensors 125 might send (either directly or indirectly) a signal to the one or more light sources 130, either wirelessly or in a wired manner.

The one or more light sources 130 might include, without limitation, one or more of at least one light emitting diode ("LED"), at least one liquid crystal display, at least one micro lamp, at least one micro bulb, and/or the like. In some cases, the at least one LED might include, but is not limited to, one of at least one organic LED ("oLED"), at least one micro LED, any suitable compact light source, and/or the like. In response to receiving the signal (either directly or indirectly) from the one or more sensors 125, the one or more light sources 130 might illuminate at least a portion (if not a substantially entire portion) of interior space 105a with light 130a that extends from the one or more light sources 130. In some cases, the one or more light sources 130 might emit light 130a that is focused on particular portion(s) of the interior space 105a, might emit light 130a that floods particular portion(s) (if not a substantially entire portion) of the interior space 105a, or might emit light 130a that illuminates particular portion(s) in a manner anywhere along a spectrum between these two extreme cases. Although FIG. 1 depicts 130a as a small cone, this is merely for illustration purposes and is intended to depict light extending in a roughly conical shape to illuminate the portion(s) of the interior space 105a, as described above.

According to some embodiments, the one or more sensors 125 and the one or more light sources 130 might be embodied in a single device 135, as shown, e.g., in the embodiment of FIG. 1A. In other embodiments, the one or more sensors 125 might be embodied in a first device(s), while the one or more light sources 130 might be embodied in a second device(s) that is separate from the first device(s), as shown, e.g., in the embodiments of FIGS. 1B and 1C. Although separate, the first device(s) and the second device(s) might be communicatively coupled either via wired connection (as denoted in FIG. 1 by solid line connections between the one or more sensors 125 and the one or more light sources 130) or via wireless connection (as denoted in FIG. 1 by lightning bolt symbol between (or beside) the one or more sensors 125 and the one or more light sources 130).

In some embodiments, the device 135 might be removably or permanently attached, affixed, or mounted via attachment mechanism 140 to one of the interior surface 105c of the portable enclosure 105 (either near the opening 105b or deep within the portable enclosure 105), a portion of the opening 105b (and/or the closure mechanism (not shown)), a portion of an exterior surface of the portable enclosure, and/or the like. In some cases, attachment mechanism might include, without limitation, at least a portion of at least one of a hook-and-loop attachment mechanism, a magnetic attachment mechanism, a clip-based attachment mechanism, an adhesive-based attachment mechanism, a buckle-based attachment mechanism, a button-based attachment mechanism, a snap-based attachment mechanism, a clasp-based attachment mechanism, a zipper-based attachment mechanism, or a pin-based attachment mechanism, and/or the like. For separate first device(s) and second device(s), attachment mechanism 140 might comprise first attachment mechanism(s) 140a and second attachment mechanism(s) 140b, respectively that might removably or permanently attach, affix, or mount the first device(s) and the second device(s), respectively, to one of the interior surface 105c of the portable enclosure 105 (either near the opening 105b (e.g., as shown in FIG. 1C) or deep within the portable enclosure 105), a portion of the opening 105b (and/or the closure mechanism (not shown), as shown in FIG. 1B), a portion of an exterior surface of the portable enclosure, and/or the like. In other words, the first device might be one of located at an opening of the portable enclosure, located within the portable enclosure near the opening of the portable enclosure, located deep within the portable enclosure, or located on an exterior surface of the portable enclosure. The second device might also be one of located at an opening of the portable enclosure, located within the portable enclosure near the opening of the portable enclosure, located deep within the portable enclosure, or located on an exterior surface of the portable enclosure. In some cases, the first device and the second device might be separately located, one at one of these locations and the other at another one of these locations. Alternatively, the first device and the second device might be co-located (i.e., located at the same one of these locations).

In operation, according to some non-limiting embodiments, when a user reaches his or her hand toward the opening 105b, through the opening 105b, and/or within interior space 105a of the user's bag (or other the portable enclosure 105), a PIR sensor (or other sensor 125) might detect either heat emitted from the hand and/or motion of the hand (thereby detecting presence of the user near or within the bag), and might send (directly or indirectly) a signal to the LEDs (or other light sources 130), which might, in response to receiving such signal, illuminate with light 130a, at least a portion of the interior of the bag. In some embodiments, the LEDs (or other light sources 130) and/or a processor (such as process 220 of FIGS. 2-3, circuit components 425 of FIG. 4, processor(s) 610 of FIG. 6, or the like) might be configured, programmed, or designed to illuminate (or cause illumination of) the at least a portion of the interior of the bag for a predetermined duration. In some instances, the predetermined duration might range from 2-10 seconds, or any suitable duration, or the like. In some cases, the predetermined duration may be set from a period at which the PIR sensor (or other sensor 125) no longer detects presence (e.g., heat, motion, or both) of the user's body part (e.g., hand or face, or the like) [i.e., 2-10 seconds after the sensor no longer detects presence of the at least a portion of the body of the user]. In such a case, the user may be provided ample time to move again to keep the light on (in the case of a motion only sensor), or to put his or her hand back within the portable enclosure and/or in detection range of the sensor (in the case of a motion and/or heat sensor). In alternative cases, the predetermined duration may be set from a period at which the PIR sensor (or other sensor 125) first detects presence (e.g., heat and/or motion) of the user's body part (e.g., hand or face, or the like) [i.e., 2-10 seconds after the sensor initially detects presence of the at least a portion of the body of the user].

In one set of non-limiting examples, when a user places his or her head over the opening 105b (without reaching in his or her hand), a PIR sensor (or other sensor 125) might detect either heat emitted from the user's head/face and/or motion of the user's head/face (thereby detecting presence of the user near the bag), and might send (directly or indirectly) a signal to the LEDs (or other light sources 130), which might, in response to receiving such signal, illuminate with light 130a, at least a portion of the interior of the bag. In some embodiments, the one or more sensors 125 might comprise eye-tracking sensors that track where the user might be looking within the portable enclosure, which might signal certain one(s) of the one or more light sources 130 to illuminate portions of the interior space 105a at which the user might be looking. According to some alternative (or additional) embodiments, particularly where each item 110 might have a designated spot within the interior of the portable enclosure 105 or where each item 110 might have a type of transponder or wireless identification mechanism (including, but not limited to, radio-frequency ("rf") tags, Bluetooth™ devices, and/or the like) that can be detected by the one or more sensors 125, the one or more sensors 125 might include voice recognition capability, such that the user might speak out the item(s) to be located (either vocally or sub-vocally), and the one or more sensors 125 (or the processor) might determine where the sought-after item(s) 110 might be located (either using the item(s)'s transponder or wireless identification mechanism, or the like), might determine which one(s) of the one or more light sources 130 might illuminate the portion(s) of the interior space 105a of the portable enclosure 105 where the sought-after item(s) 110 might be located, and might send signals to the determined one(s) of the one or more light sources 130 to illuminate the determined portion(s) of the interior space 105a of the portable enclosure 105 where the sought-after item(s) 110 might be located.

According to some embodiments, which might be in conjunction with any of the above-mentioned embodiments, the one or more sensors 125 might also be configured to detect external light (e.g., room light, street light, sunlight, and/or the like), and determine whether the external light is sufficient to illuminate the interior space 105a (without the use of the one or more light sources 130). In some cases, a processor (as described below with respect to FIG. 2, 3, or 6) might make such determination. Based on a determination that the external light is sufficient, the one or more sensors 125 or the processor might not send the signal (to instruct illumination of the interior space 105a) to the one or more light sources 130. However, based on a determination that the external light is insufficient to illuminate the interior space 105s (or that there is no external light), the one or more sensors 125 or the processor might send a signal (to instruct illumination of the interior space 105a) to the one or more light sources 130.

Figure 2A:
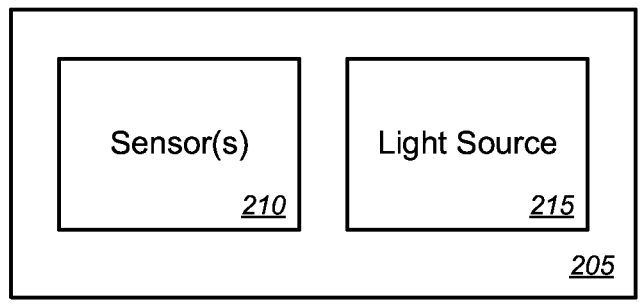
FIGS. 2A and 2B are general block diagrams illustrating various apparatuses for providing illumination within a portable space, in accordance with various embodiments.
Figure 2B:
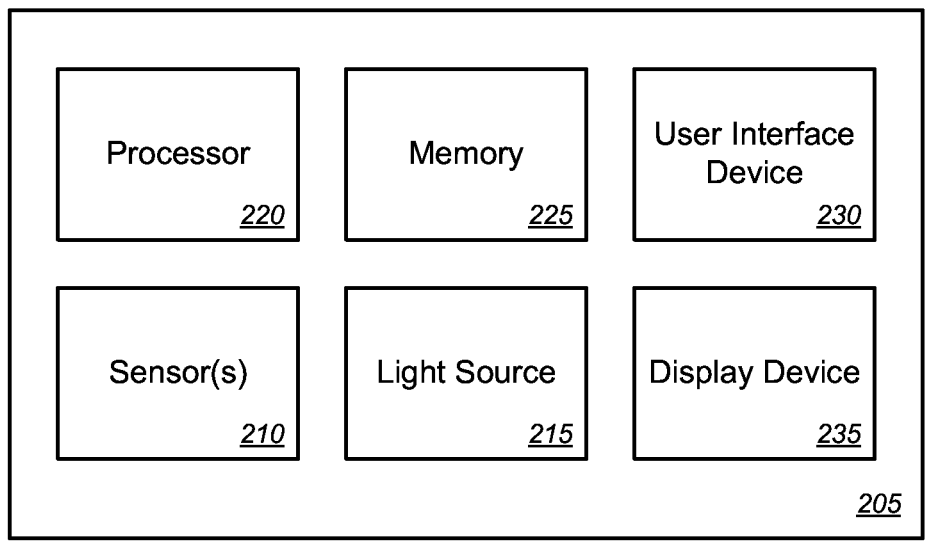

We now turn to FIGS. 2A and 2B (collectively, "FIG. 2"), which are general block diagrams illustrating various apparatuses 200 for providing illumination within a portable space, in accordance with various embodiments. FIG. 2A depicts a basic embodiment, while FIG. 2B depicts a more complex embodiment.

In the embodiment of FIG. 2A, apparatus 200 might comprise device housing 205, within which apparatus 200 might comprise a sensor(s) 210 and a light source(s) 215.

Sensor(s) 210 might correspond to the one or more sensors 125, while light source(s) 215 might correspond to the one or more light sources 130, and device housing 205 might correspond to device 140. As such, the descriptions of the one or more sensors 125, the one or more light sources 130, and the device 140 are applicable to the sensor(s) 210, the light source(s) 215, and the device housing 205, respectively, and are omitted herein to avoid excessive duplication. Although not shown, apparatus 200 might further comprise (within device housing 205) a power source for providing electrical power to each of the sensor(s) 210 or the light source(s) 215. The power source might include, without limitation, a battery-based power source, a solar-based power source, a kinetic motion-based power source, an induction-based power source, and/or the like. In some cases, the solar-based power source and the kinetic motion-based power source might each be similar to corresponding power sources in solar-powered watches and in kinetic watches, respectively, or the like. In some cases, although also not shown, apparatus 200 might further comprise an attachment mechanism (either permanently or removably affixed, attached, or mounted to device housing 205), not unlike the attachment mechanism 140, as described in detail above with respect FIG. 1.

In the embodiment of FIG. 2B, apparatus 200 might be similar to apparatus 200 of FIG. 2A, except that apparatus 200 might further comprise (within device housing 205) one or more of processor 220, memory 225, user interface device 230, display device 235, and/or the like. As alluded to in the description of FIG. 1, processor 220 might determine whether to cause the light source(s) to illuminate the interior space of the bag or other portable enclosure (as well as determining which portions of the interior space), based at least in part on sensor readings from sensor(s) 210 whether a portion of the user's body is detected within the bag or other portable enclosure (and which parts), whether a portion of the user's body is detected near an opening of the bag or other portable enclosure, whether there is sufficient external light, where particular item(s) might be located in the bag or other portable enclosure, and/or the like. Memory 225 might store determined locations of particular item(s) within the bag or other portable enclosure (if applicable), which light sources illuminate which portions of the interior of the bag or other portable enclosure, voiceprints of the user (if applicable), and/or the like. User interface device 230 might comprise any suitable type of user interface, including, but not limited to, a touch screen display interface, a input button-based interface, a voice interface, and/or the like. The display device 235 might comprise a touch screen display, a non-touchscreen display, a series of lights (e.g., LED lights, micro bulb lights, etc.), and/or the like. The processor 220 might be communicatively coupled to each of the sensor(s) 210, the light source(s) 215, the memory 225 (if any), the user interface device 230 (if any), and the display device 235 (if any).

Figure 3A:
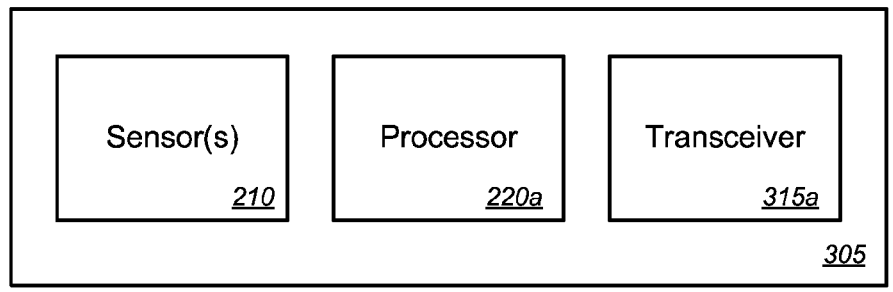
FIGS. 3A and 3B are general block diagrams illustrating various other apparatuses for providing illumination within a portable space, in accordance with various embodiments.
Figure 3A:
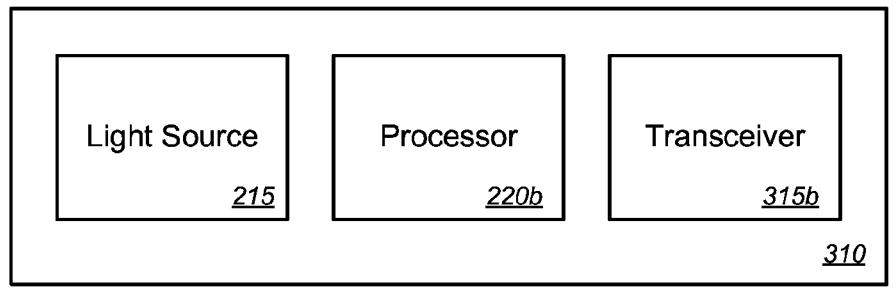
Figure 3B:
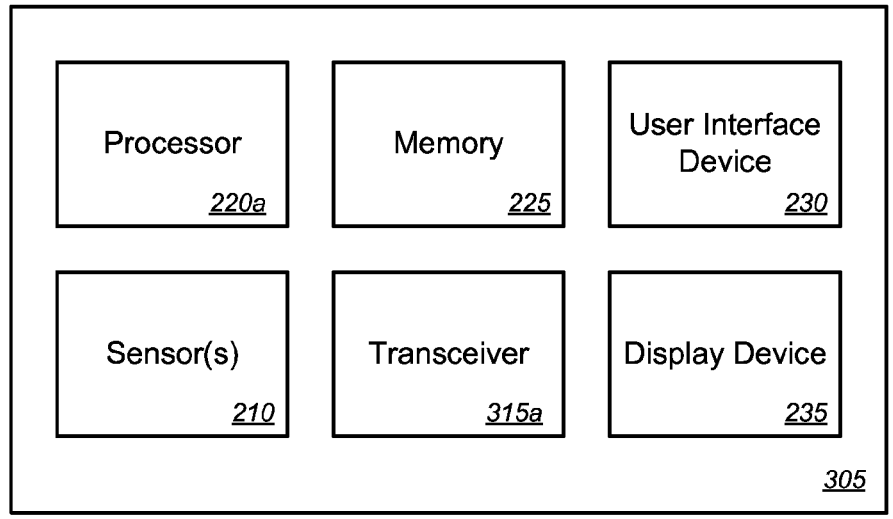
Figure 3B:
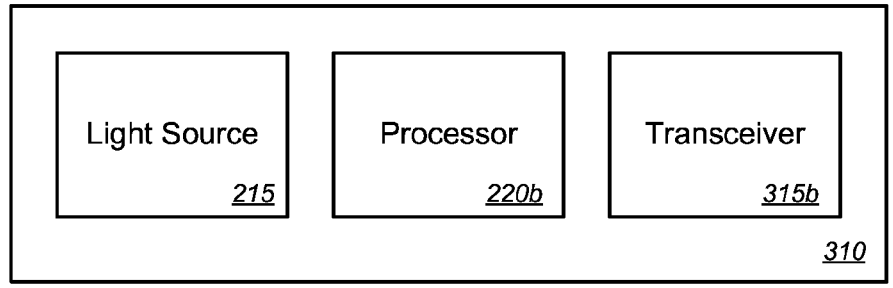

With reference to FIGS. 3A and 3B (collectively, "FIG. 3"), are general block diagrams illustrating various other apparatuses 300 for providing illumination within a portable space, in accordance with various embodiments. FIG. 3 is similar to FIG. 2, except that the sensor(s) 210 and the light source(s) 215 are embodied as separate devices that are in communication with each other. The various components of apparatus 300 are otherwise similar to, if not the same as, the corresponding components of apparatus 200 in the embodiment of FIG. 2, and the descriptions thereof are applicable to components of apparatus 300 (and are omitted here to avoid excessive duplication).

In the non-limiting embodiment of FIG. 3A, apparatus 300 might comprise a first device 305 and a second device 310, which is separate from the first device 305. In some embodiments, the first device 305 might include, without limitation, sensor(s) 210, first processor(s) 220a, and first transceiver(s) 315a. The second device 310 might include, but is not limited to, light source(s) 215, second processor(s) 220b, and second transceiver(s) 315b. First transceiver(s) 315a and second transceiver(s) 315b (collectively, "transceivers 315") might include wired transceivers, wireless transceivers, separate transmitters and receivers (either wired or wireless), and/or the like.

In the non-limiting embodiment of FIG. 3B, the first device 305 might be similar to the first device 305 shown in FIG. 3A, except that the first device 305 of FIG. 3B, like apparatus 200 of FIG. 2B, might further comprise one or more of processor 220, memory 225, user interface device 230, display device 235, and/or the like. Although not shown, each of the first device 305 or the second device 310 might further comprise a power source and an attachment mechanism. The sensor(s) 210, light source(s) 215, processors 220a/220b, memory 225, user interface device 230, display device 235, power source, and attachment mechanism of FIG. 3 corresponds to sensor(s) 210, light source(s) 215, processors 220, memory 225, user interface device 230, display device 235, power source, and attachment mechanism of FIG. 2, and the descriptions of these components of the embodiment of FIG. 2 apply to the corresponding components of the embodiment of FIG. 3.

FIGS. 4A-4C (collectively, "FIG. 4") are diagrams illustrating one set of embodiments for an apparatus 400 for providing illumination within a portable space. FIGS. 4A and 4B depict general schematic diagrams illustrating a non-limiting embodiment of a device 400 for providing illumination within a portable space. In particular, FIGS. 4A and 4B illustrate a non-limiting example of the layout of components for the device 400. FIG. 4C depicts an example circuit diagram for a non-limiting embodiment of a device 400 for providing illumination within a portable space.

With reference to FIG. 4A, device 400 might comprise frame element 405, a power source 410, a sensor 415, and one or more light sources 420. The frame element 405 might include, but is not limited to, a chassis, a circuit board (as shown in FIG. 4), and/or the like. The power source 410 might comprise a battery. In some cases, the power source 410 might further comprise a solar cell, which may be configured to charge the battery. In alternative cases, the power source 410 might further comprise a kinetic drive, which may or may not be used to charge the battery; in some of these cases, the power source 410 might comprise the kinetic drive without comprising a battery. According to some embodiments, sensor 415 might include a PR sensor or the like. In some cases, the PIR sensor might include, without limitation, one of a compact PIR sensor, a low-energy compact PR sensor, a compact low-energy short range PIR sensor, and/or the like. In some instances, the one or more light sources 420 might each include, but is not limited to, a LED, an oLED, a LCD, a micro lamp, a micro bulb, and/or the like. Although two light sources 420 are shown in FIG. 4, the various embodiments are not so limited, and any suitable number of light sources may be used.

In some cases, device 400 might further comprise a set of circuit components 425, which might be communicatively coupled in a manner such as shown in the embodiment of FIG. 4C or might be communicatively coupled in any other suitable manner, as appropriate to allow device 400 to provide illumination within a portable space (such as within a portable enclosure or the like). In some embodiments, the set of circuit components 425 might comprise one or more of a processor, memory, user interface device, display device, and/or transceiver (such as processor 220, memory 225, user interface device 230, display device 235, and/or transceiver 315, respectively, of FIGS. 2 and 3), or the like. Although not shown, a device housing might encase frame element 405 (as well as the various components described above).

Turning to FIG. 4C, a non-limiting example circuit diagram of one set of embodiments of the device 400 is shown. In FIG. 4C, device 400 might comprise a battery 410, a PIR sensor 415, a couple of LEDs 420, a transistor 430, a linear regulator 435, a plurality of resistors 440a-440d, a plurality of capacitors 445a-445b, and a plurality of ground connections 450. Although a particular configuration of these circuit components are shown, any suitable configuration of these circuit components and/or other circuit components may be implemented without deviating from the scope of the various embodiments. For example, in some embodiments, one or more diodes may be included in the circuit to prevent damage to the circuit in the case that a user reverses the polarity of the battery(ies) when inserting the battery(ies), or the like. Appropriate circuit components and configurations may also be provided for other forms of circuit protection, as appropriate. In some cases, one or more circuit components shown may even be omitted, while still providing the functionalities described herein.

In operation, when the sensor 415 detects either heat or motion of a user's body part (e.g., hand, face, or the like), the sensed presence of the user's body part triggers operation of the one or more light sources 420 to illuminate the space in which the device 400 might be located (such as in a bag or other portable enclosure). In some cases, as with directed light sources or the like, the device 400 need not be located within the space to be illuminated, but may be positioned proximate (or, in some cases, adjacent) to such a space. According to some embodiments, the device 400 might be positioned at an opening to the portable enclosure, with the light sources directed toward (or pointed toward) the space to be illuminated (e.g., interior space of the bag or other portable enclosure).

In some embodiments, sensor 415 might further comprise an ambient light sensor (not shown), which might sense the existing light currently illuminating the interior space to be illuminated. The ambient light sensor might prevent triggering of the operation of the light sources 420 if it is determined that there is sufficient ambient light (e.g., from sunlight, room lights, etc.) that is illuminating the space within the portable enclosure. Based upon a determination by the ambient light sensor that there is insufficient ambient light illuminating the space within the portable enclosure, and in response to sensing the presence of the user's body part, the ambient light sensor might allow the sensor 415 to trigger operation of the one or more light sources 420 to illuminate the space within the bag or portable enclosure.

In one non-limiting example, a device (e.g., a compact low energy short range device, or the like) might comprise 2 coin cell batteries that might total 6 V and 320 mAh. Two white LEDs with an approximate voltage of 3.2 V and a current usage of 20 mA per LED might be used. A PIR sensor having a voltage of 3V and a working current of 12 µA might be communicatively coupled in the circuit to cause the LEDs to illuminate a desired space (e.g., interior space of a bag or other portable enclosure), in response to detecting heat or motion of a user's body part(s) (e.g., hand, head, face, etc.). Because it is not required to detect motion over large distances (such as in a room of a house or the like), much less energy is required for the device to provide illumination for the space. Using the 2 coin cell batteries totaling 6V and 320 mAh with an average use of 10 seconds of light time 20 times a day will have a life span of about 265 days. Although the embodiment above is described with respect to illuminating an interior space of a bag, this device could be placed anywhere where motion is detected in short distances and where additional light is needed or desired (e.g., a portable enclosure as described in detail above).

According to some embodiments, the first device might comprise an infrared sensor. In some cases, the infrared sensor might comprise a passive infrared ("PIR") sensor. In some instances, the infrared sensor might comprise a compact PR sensor. In some embodiments, detecting, with the first device, presence of at least a portion of a body of a user might comprise detecting, with the infrared sensor, heat emitted by the at least a portion of the body of the user. In some cases, detecting, with the first device, presence of at least a portion of a body of a user might comprise detecting, with the infrared sensor, motion of the at least a portion of the body of the user. In some embodiments, detecting, with the first device, presence of at least a portion of a body of a user might comprise detecting, with the first device, presence of at least a portion of a body of a user within the portable enclosure. According to some embodiments, detecting, with the first device, presence of at least a portion of a body of a user might comprise detecting, with the first device, presence of at least a portion of a body of a user near an opening of the portable enclosure.

In some embodiments, the second device might comprise at least one light source. In some instances, the at least one light source might comprise at least one light emitting diode ("LED"). In some cases, the at least one light source might comprise at least one organic light emitting diode ("oLED"). In yet other cases, the at least one light source might including, without limitation, one or more of at least one liquid crystal display ("LCD"), at least one micro lamp, at least one micro bulb, at least one micro LED, and/or the like.

In some instances, each of the first device, the second device, or the third device is removably attachable to at least one of an interior surface of the portable enclosure and/or an opening of the portable enclosure. According to some embodiments, the first device might be located at an opening of the portable enclosure, while the second device might be located within the portable enclosure. In some cases, at least one of the first device, the second device, or the third device might comprise an attachment mechanism configured to attach to a surface of the portable enclosure. The attachment mechanism, in some instances, might comprise at least one of a portion of a hook-and-loop attachment mechanism, a magnetic attachment mechanism, a clip-based attachment mechanism, an adhesive-based attachment mechanism, a buckle-based attachment mechanism, a button-based attachment mechanism, a snap-based attachment mechanism, a clasp-based attachment mechanism, a zipper-based attachment mechanism, or a pin-based attachment mechanism, and/or the like. According to some embodiments, the single third device might be one of located at an opening of the portable enclosure, located within the portable enclosure near the opening of the portable enclosure, or located deep within the portable enclosure.

In some cases, the portable enclosure might comprise one of a bag, a box (i.e., a box that is not (and is not intended to be) mounted to any structure or surface), a cargo container (or shipping container, or the like), or a vehicle. In some instances, the bag might comprise one of a piece of luggage, a travel bag, a tote, a lunch bag, a purse, a handbag, a backpack, a satchel, a briefcase, a laptop bag, a tool bag, a hiking bag, a bandolier, a pouch, a belted bag, a waist pack, a gym bag, or a sports equipment bag.

According to some embodiments, illuminating, with a second device, the interior space of the portable enclosure might comprise illuminating, with a second device, the interior space of the portable enclosure, based at least in part on detection of the presence of the at least a portion of the body of the user and based at least in part on a determination that external light (e.g., room light, street light, sunlight, and/or the like) is insufficient to illuminate the interior space of the portable enclosure.

As described herein, the sensor may be configured or designed to detect the presence (e.g., heat and/or motion) of a user's body part anyway within the portable enclosure, regardless of the size of the portable enclosure (i.e., from a small purse or pouch to a massive cargo container, or the like). These and other features or functionalities of the devices, sensors, and light sources with respect to providing illumination within an interior space of the portable enclosure are described in detail with respect to FIGS. 1-3 and 5.

Figure 5:
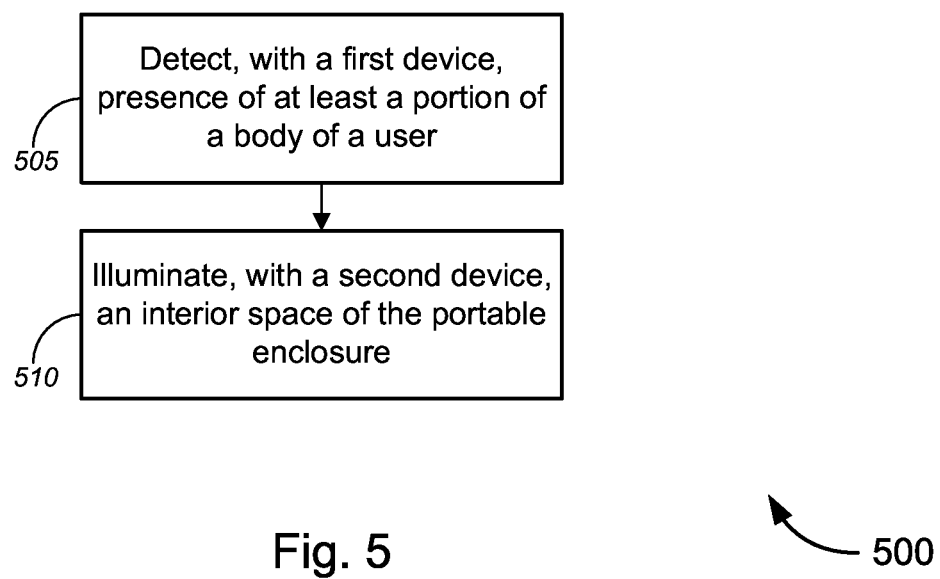
FIG. 5 is a general schematic flow diagram illustrating a method for providing illumination within a portable space, in accordance with various embodiments.

We now turn to FIG. 5, which is a general schematic flow diagram illustrating a method 500 for providing illumination within a portable space, in accordance with various embodiments. In FIG. 5, method 500 might comprise detecting, with a first device, presence of at least a portion of a body of a user (block 505) and illuminating, with a second device, an interior space of the portable enclosure, based at least in part on detection of the presence of the at least a portion of the body of the user (block 510). In some cases, detecting presence of at least a portion of the body of the user might comprise one of detecting presence of at least a portion of the body of the user (e.g., the user's hand) within the interior space of the portable enclosure or detecting presence of at least a portion of the body of the user (e.g., the user's hand or face) near/at an opening of the portable enclosure (such as when the user has her face above the opening of a bag to look within the bag, or the like). In some cases, detecting, with the first device, presence of at least a portion of a body of a user comprises detecting, with the infrared sensor, at least one of heat emitted by the at least a portion of the body of the user and/or motion of the at least a portion of the body of the user.

According to some embodiments, illuminating, with a second device, the interior space of the portable enclosure might comprise illuminating, with a second device, the interior space of the portable enclosure, based at least in part on detection of the presence of the at least a portion of the body of the user within the interior space of the portable enclosure and based at least in part on a determination that external light is insufficient to illuminate the interior space of the portable enclosure. In some cases, illuminating, with a second device, the interior space of the portable enclosure might comprise illuminating, with a second device, the interior space of the portable enclosure for a predetermined duration (e.g., a duration ranging from about 2-10 seconds after the first device no longer detects presence of the at least a portion of the body of the user, or a duration ranging from about 2-10 seconds after initial detection by the first device of the at least a portion of the body of the user, or any suitable predetermined duration, or the like).

In some embodiments, the first device and the second device are separate devices that are in communication with each other (either via wired connection or via wireless connection). According to some embodiments, the first device and the second device might be embodied as a single device (such as device 135 that is shown and described with respect to FIG. 1A).

These techniques and other features or functionalities of the devices, sensors, and light sources that function in accordance with these techniques (particularly with respect to providing illumination within an interior space of the portable enclosure) are described in detail with respect to FIGS. 1-4.

Figure 6:
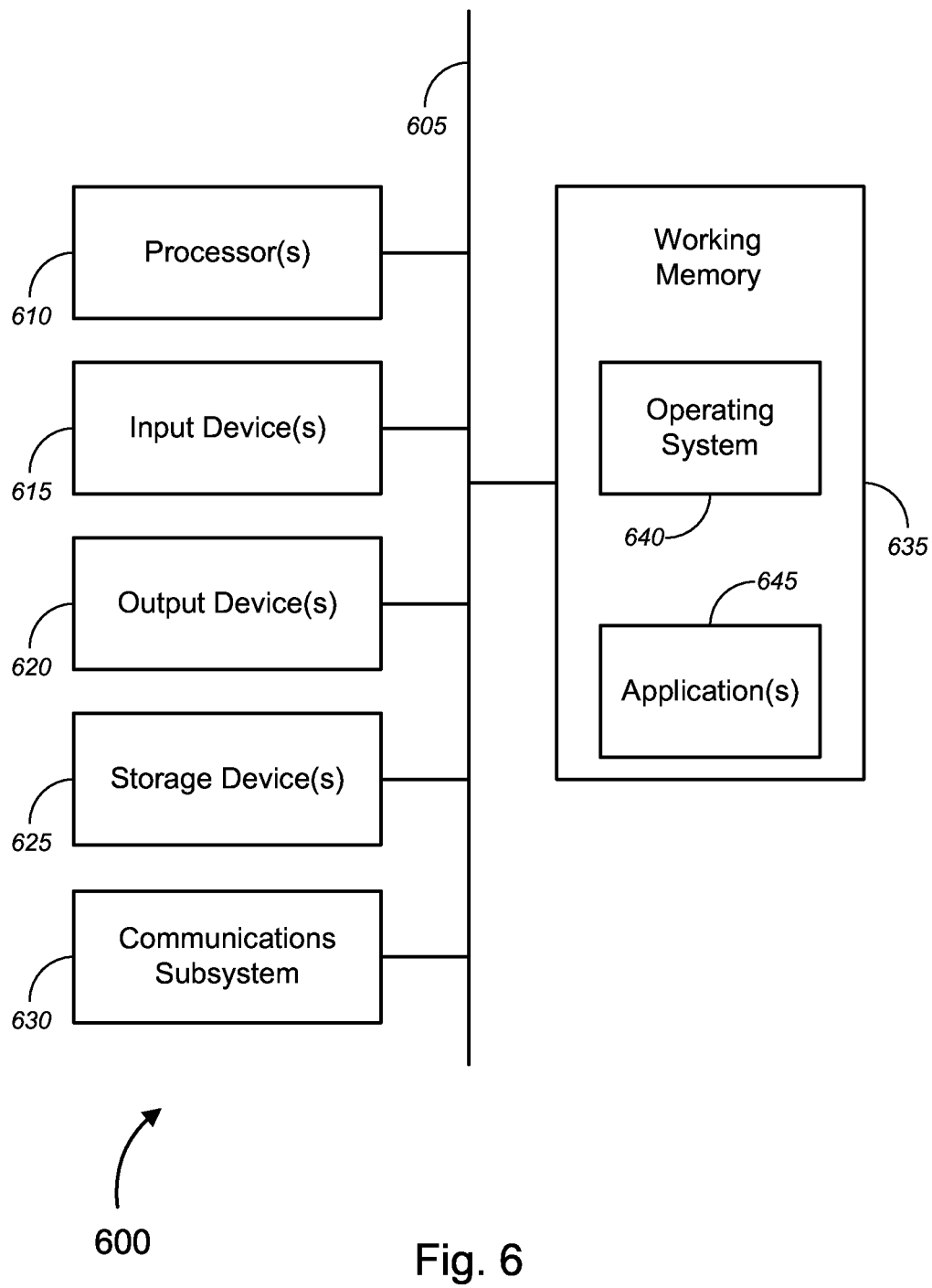
FIG. 6 is a block diagram illustrating an exemplary computer architecture, in accordance with various embodiments.

FIG. 6, which is a block diagram illustrating an exemplary computer architecture, provides a schematic illustration of one embodiment of a computer system 600 that can perform the methods provided by various other embodiments, as described herein, and/or can perform the functions of local computer system or processor 220, or other computer systems or sensors (e.g., sensor(s) 125 or 210), as described above. It should be noted that FIG. 6 is meant only to provide a generalized illustration of various components, of which one or more, or none, of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605, or may otherwise be in communication, as appropriate. The hardware elements may include one or more processors 610, including without limitation one or more general-purpose processors, or one or more special-purpose processors such as digital signal processing chips, graphics acceleration processors, microprocessor, control circuit, or the like; one or more input devices 615, which can include without limitation a keypad, button-based interface, voice input device, touchscreen display, or the like; and one or more output devices 620, which can include without limitation a display device, a set of lights, a speaker, or the like.

The computer system 600 may further include, or be in communication with, one or more storage devices 625. The one or more storage devices 625 can comprise, without limitation, local and/or network accessible storage, or can include, without limitation, a disk drive, a drive array, an optical storage device, a solid-state storage device. The solid-state storage device can include, but is not limited to, one or more of a random access memory ("RAM") or a read-only memory ("ROM"), which can be programmable, flash-updateable, or the like. Such storage devices may be configured to implement any appropriate data stores, including without limitation various file systems, database structures, or the like.

The computer system 600 might also include a communications subsystem 630 (e.g., transceiver 315 of FIG. 3), which can include without limitation a modem, a network card (wireless or wired), an infra-red communication device, a wireless communication device or chipset, or the like. The wireless communication device might include, but is not limited to, a Bluetooth™ device, an 802.11 device, a WiFi device, a WiMax device, a WWAN device, cellular communication facilities, or the like.

The communications subsystem 630 may permit data to be exchanged with a network (such as network 125, to name an example), with other computer systems, with various devices (e.g., first device, second device, third device of FIGS. 1-3, etc.), with any other devices described herein, or with any combination of network, systems, and devices. According to some embodiments, network 125 might include a local area network ("LAN"), including without limitation a fiber network, an Ethernet network, a Token-Ring™ network, and the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol, or any other wireless protocol; or any combination of these or other networks. In many embodiments, the computer system 600 will further comprise a working memory 635, which can include a RAM or ROM device, as described above.

The computer system 600 may also comprise software elements, shown as being currently located within the working memory 635, including an operating system 640, device drivers, executable libraries, or other code. The software elements may include one or more application programs 645, which may comprise computer programs provided by various embodiments, or may be designed to implement methods and/or configure systems provided by other embodiments, as described herein. Merely by way of example, one or more procedures described with respect to the methods discussed above might be implemented as code or instructions executable by a computer or by a processor within a computer. In an aspect, such code or instructions can be used to configure or adapt a general purpose computer, or other device, to perform one or more operations in accordance with the described methods.

A set of these instructions or code might be encoded and/or stored on a non-transitory computer readable storage medium, such as the storage devices 625 described above. In some cases, the storage medium might be incorporated within a computer system, such as the system 600. In other embodiments, the storage medium might be separate from a computer system—that is, a removable medium, such as a compact disc, flash drive, secure digital card, other memory media, or the like. In some embodiments, the storage medium might be provided in an installation package, such that the storage medium can be used to program, configure, and/or adapt a general purpose computer with the instructions/code stored thereon. These instructions might take the form of executable code, which is executable by the computer system 600, or might take the form of source or installable code. The source or installable code, upon compilation, installation, or both compilation and installation, on the computer system 600 might take the form of executable code. Compilation or installation might be performed using any of a variety of generally available compilers, installation programs, compression/decompression utilities, or the like.

It will be apparent to those skilled in the art that substantial variations may be made in accordance with specific requirements. For example, customized hardware—such as programmable logic controllers, field-programmable gate arrays, application-specific integrated circuits, or the like—might also be used. In some cases, particular elements might be implemented in hardware, software (including portable software, such as applets, etc.), or both. Further, connection to other computing devices such as network input/output devices may be employed.

As mentioned above, in one aspect, some embodiments may employ a computer system, such as the computer system 600, to perform methods in accordance with various embodiments of the invention. According to a set of embodiments, some or all of the procedures of such methods might be performed by the computer system 600 in response to processor 610 executing one or more sequences of one or more instructions. The one or more instructions might be incorporated into the operating system 640 or other code that may be contained in the working memory 635, such as an application program 645. Such instructions may be read into the working memory 635 from another computer readable medium, such as one or more of the storage devices 625. Merely by way of example, execution of the sequences of instructions contained in the working memory 635 might cause the one or more processors 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions or code to the one or more processors 610 for execution, might be used to store and/or carry such instructions/code such as signals, or both. In many implementations, a computer readable medium is a non-transitory, physical, or tangible storage medium. Such a medium may take many forms, including, but not limited to, non-volatile media, volatile media, and transmission media. Non-volatile media includes, for example, optical disks, magnetic disks, or both, such as the storage devices 625. Volatile media includes, without limitation, dynamic memory, such as the working memory 635. Transmission media includes, without limitation, coaxial cables, copper wire and fiber optics, including the wires that comprise the bus 605, as well as the various components of the communication subsystem 630, or the media by which the communications subsystem 630 provides communication with other devices. Hence, transmission media can also take the form of waves, including without limitation radio, acoustic, or light waves, such as those generated during radio-wave and infra-red data communications.

Common forms of physical or tangible computer readable media include, for example, a floppy disk, a flexible disk, a hard disk, magnetic tape, or any other magnetic medium; a CD-ROM, DVD-ROM, or any other optical medium; punch cards, paper tape, or any other physical medium with patterns of holes; a RAM, a PROM, an EPROM, a FLASH-EPROM, or any other memory chip or cartridge; a carrier wave; or any other medium from which a computer can read instructions or code.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    detecting, with a first device, presence of at least a portion of a body of a user within an interior space of a portable enclosure;
    illuminating, with a second device, the interior space of the portable enclosure, based at least in part on detection of the presence of the at least a portion of the body of the user within the interior space of the portable enclosure.

2. The method of claim 1, wherein each of the first device or the second device is removably attachable to at least one of an interior surface of the portable enclosure or an opening of the portable enclosure.

3. The method of claim 1, wherein the first device comprises an infrared sensor.

4. The method of claim 3, wherein the infrared sensor comprises a passive infrared sensor.

5. The method of claim 3, wherein the infrared sensor comprises a compact passive infrared sensor.

6. The method of claim 3, wherein detecting, with the first device, presence of at least a portion of a body of a user comprises detecting, with the infrared sensor, heat emitted by the at least a portion of the body of the user.

7. The method of claim 3, wherein detecting, with the first device, presence of at least a portion of a body of a user comprises detecting, with the infrared sensor, motion of the at least a portion of the body of the user.

8. The method of claim 1, wherein the second device comprises at least one light source.

9. The method of claim 8, wherein the at least one light source comprises at least one light emitting diode.

10. The method of claim 1, wherein the first device and the second device are separate devices that are communicatively coupled together.

11. The method of claim 10, wherein the first device and the second device are in wireless communication with each other.

12. The method of claim 10, wherein the first device and the second device are in wired communication with each other.

13. The method of claim 10, wherein the first device is one of located at an opening of the portable enclosure, located within the portable enclosure near the opening of the portable enclosure, or located deep within the portable enclosure, and the second device is one of located at an opening of the portable enclosure, located within the portable enclosure near the opening of the portable enclosure, or located deep within the portable enclosure.

14. The method of claim 13, wherein the first device and the second device are co-located.

15. The method of claim 1, wherein the first device and the second device are embodied within a single third device.

16. The method of claim 15, wherein at least one of the first device, the second device, or the third device comprises an attachment mechanism configured to attach to a surface of the portable enclosure.

17. The method of claim 16, wherein the attachment mechanism comprises at least a portion of at least one of a hook-and-loop attachment mechanism, a magnetic attachment mechanism, a clip-based attachment mechanism, an adhesive-based attachment mechanism, a buckle-based attachment mechanism, a button-based attachment mechanism, a snap-based attachment mechanism, a clasp-based attachment mechanism, a zipper-based attachment mechanism, or a pin-based attachment mechanism.

18. The method of claim 15, wherein the single third device is one of located at an opening of the portable enclosure, located within the portable enclosure near the opening of the portable enclosure, or located deep within the portable enclosure.

19. The method of claim 1, wherein the portable enclosure comprises one of a bag, a portable box, a cargo container, or a vehicle.

20. The method of claim 19, wherein the bag comprises one of a piece of luggage, a travel bag, a tote, a lunch bag, a purse, a handbag, a backpack, a satchel, a briefcase, a laptop bag, a tool bag, a hiking bag, a bandolier, a pouch, a belted bag, a waist pack, a gym bag, or a sports equipment bag.

21. The method of claim 1, wherein illuminating, with a second device, the interior space of the portable enclosure comprises illuminating, with a second device, the interior space of the portable enclosure, based at least in part on detection of the presence of the at least a portion of the body of the user within the interior space of the portable enclosure and based at least in part on a determination that external light is insufficient to illuminate the interior space of the portable enclosure.

22. A system, comprising:
    a portable enclosure;
    a first device, comprising:
        a sensor that is configured to detect presence of at least a portion of a body of a user within an interior space of the portable enclosure; and
    a second device, comprising:
        a light source that is configured to illuminate the interior space of the portable enclosure, based at least in part on detection of the presence of the at least a portion of the body of the user within the interior space of the portable enclosure.

23. The system of claim 22, wherein the first device and the second device are embodied within a single third device.

24. An apparatus, comprising:
    a first device, comprising:
        a sensor that is configured to detect presence of at least a portion of a body of a user within an interior space of a portable enclosure;
    a second device, comprising:
        a light source that is configured to illuminate the interior space of the portable enclosure, based at least in part on detection of the presence of the at least a portion of the body of the user within the interior space of the portable enclosure.

25. The apparatus of claim 24, further comprising:
    at least one processor; and
    a computer readable medium in communication with the at least one processor, the computer readable medium having stored thereon computer software comprising a set of instructions that, when executed by the at least one process, causes the apparatus to perform one or more functions, the set of instructions comprising:

instructions for receiving presence information from the sensor, in response to the sensor detecting presence of at least a portion of a body of a user within the interior space of the portable enclosure;

instructions for causing the light source to illuminate the interior space of the portable enclosure, based at least in part on the received presence information from the sensor.

26. The apparatus of claim 25, wherein the instructions for causing the light source to illuminate the interior space of the portable enclosure comprises instructions for causing the light source to illuminate the interior space of the portable enclosure, based at least in part on detection of the presence of the at least a portion of the body of the user within the interior space of the portable enclosure and based at least in part on a determination that external light is insufficient to illuminate the interior space of the portable enclosure.

27. The apparatus of claim 25, wherein the instructions for causing the light source to illuminate the interior space of the portable enclosure comprises instructions for causing the light source to illuminate the interior space of the portable enclosure for a predetermined duration.

* * * * *